O. O. KRUH.
VAPOR ELECTRIC APPARATUS.
APPLICATION FILED MAR. 16, 1904.

1,071,060.

Patented Aug. 26, 1913.

WITNESSES:

INVENTOR:
Osias Otto Kruh,
By Alfred G. Davis
Att'y.

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

VAPOR ELECTRIC APPARATUS.

1,071,060.　　　　　Specification of Letters Patent.　　Patented Aug. 26, 1913.

Application filed March 16, 1904. Serial No. 198,378.

*To all whom it may concern:*

Be it known that I, OSIAS OTTO KRUH, a subject of the Emperor of Austria-Hungary, residing at Schenectady, in the county of Schenectady and State of New York, have invented certain new and useful Improvements in Vapor Electric Apparatus, of which the following is a specification.

My present invention relates to the starting of vapor electric apparatus and more particularly of that type of apparatus which operates normally with alternating current.

The novel features characteristic of my invention are pointed out with particularity in the appended claims. The invention itself, however, will be better understood by reference to the following description taken in connection with the accompanying drawings which represent one of the more particularly useful embodiments of the invention.

Figure 1:
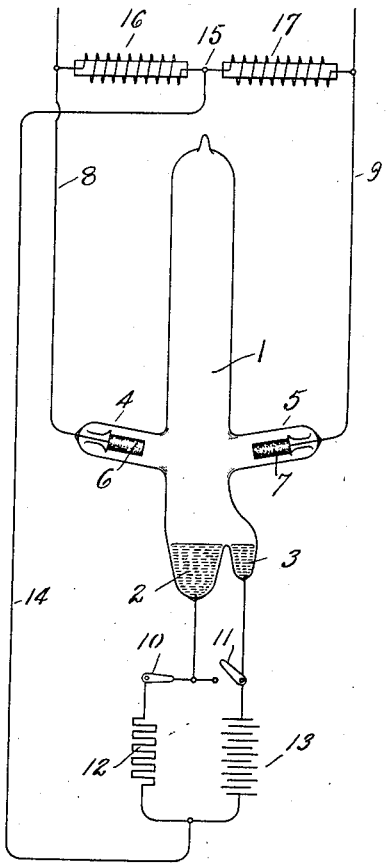
Figure 2:
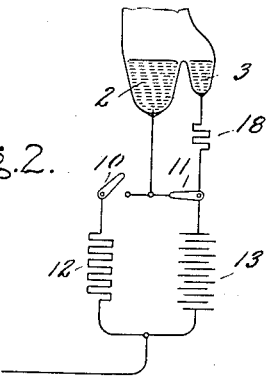

Figure 1 represents, in its starting position, an arrangement whereby a mercury vapor rectifier for charging a storage battery may be quickly and positively started by a suitable application of direct current from the battery. Fig. 2 is a representation of so much of the circuits of Fig. 1 as is necessary to show the connections under running conditions.

In Fig. 1 the rectifier chosen for purposes of illustration is intended as typical of any vapor rectifier. It consists of a vertical tube 1 having at the bottom adjacent pockets filled with bodies of mercury 2 and 3 constituting respectively a main and a starting or supplemental electrode. Tubular projections 4 and 5 extend oppositely from the sides of the tube 1 as indicated and contain electrodes 6 and 7 which in this case, may be of iron, graphite or other suitable material. All of the electrodes are provided in the usual manner with suitable leading-in conductors. The electrodes 6 and 7, operated as anodes or positive electrodes, are connected respectively with alternating current supply leads 8 and 9. The lower electrodes 2 and 3 are connected respectively to switches 10 and 11. The switch 10 serves to make and break connection between the electrode 2, or cathode, and one end of a resistance 12. The other switch 11 serves when closed to short circuit the electrodes 2 and 3. To this switch is connected the positive terminal of the storage battery 13 which is to be charged by the rectifier. The lower end of the resistance 12 and the negative terminal of the storage battery 13 are connected together and to a lead 14 extending to the junction 15 between two inductance coils 16 and 17 in series between the leads 8 and 9.

With the switches 10 and 11 in the positions shown in Fig. 1 it will be clear that if the rectifier be shaken so as to cause a temporary flow of mercury between the electrodes 2 and 3, an arc will be established in the rectifier due to the passage of current from the battery through the rectifier from the electrode 3 to the main electrode or cathode 2 and back through the resistance 12 to the negative terminal of the battery. The electrode 2 thus readily and certainly becomes an active cathode, whereupon positive current pulsations immediately commence to flow from the respective anodes 6 and 7 to the cathode 2 and through the resistance 12 back to the junction 15 whence they divide and return in appropriate directions to the source in a manner well understood to one skilled in the art. The rectifier, having now been started, will continue to operate in the usual way without further assistance from the starting arc between the additional electrode 3 and the cathode 2. The switch 11 may now be closed, whereupon the starting arc, being short circuited by the switch, goes out, and the battery 13 is put in multiple with the resistance 12. The switch 10 may then be opened whereupon the battery 13 is placed directly in series with the rectifier and receives charging current therefrom. This new position of the switches is shown in Fig. 2.

In Fig. 2 I have represented at 18 an additional resistance which is placed in series with the electrode 3 so as to reduce the current in the starting arc to a low value. If desired, however, the resistance 12 may be used without the additional resistance 18.

The apparatus which I have above described is intended merely as an illustration of one of the many useful embodiments which my invention may assume in practice. For this reason I do not wish to be limited to the details shown and described.

What I claim as new and desire to secure by Letters Patent of the United States, is,

1. The combination of a vapor rectifier, an energy storing device adapted to be connected in circuit with the cathode of said rectifier during normal operation, means for connecting said device in starting relation to said rectifier, and means affording a path for the direct current from said rectifier.

2. The combination of a rectifier, a storage battery, means for starting the rectifier through the instrumentality of the battery, and means for connecting the battery so as to be charged by current from the rectifier.

3. The combination of a vapor rectifier, a battery, a current conducting device adapted to be placed in shunt to the battery, means for supplying a starting current to the rectifier from said battery, and means for connecting the said current conducting device in the place of the battery when the battery is thus used for starting purposes.

4. The combination of a vapor electric apparatus, an energy storing device normally in circuit with the cathode of said apparatus, means for replacing said energy storing device with a suitable current conveying means, and means for connecting said energy storing device to start said apparatus.

5. The combination of a vapor electric apparatus having a plurality of electrodes, one at least of which operates as a cathode, a storage battery normally in circuit with the cathode, means for shunting said battery, and means for passing current from said battery between a positive electrode and said cathode to start the apparatus.

6. The combination of a source of alternating current, leads extending therefrom, a vapor electric device having working anodes connected to said leads, a cathode coöperating with said anodes, a return circuit, a starting electrode coöperating with said cathode, a battery connected at one end to said return circuit and at the other end to said starting electrode, a switch for connecting the battery to the cathode, and a resistance adapted to be connected between the cathode and the return circuit.

7. The method of operating a vapor rectifier, which consists in deriving a starting current from a suitable source, producing rectified current, interrupting the starting current, and then passing rectified current to said source while continuing said rectifier in operation.

8. The combination of a rectifier, a storage battery, and means for interchangeably connecting the battery to said rectifier, and a load for the rectifier while the battery is in starting relation to the rectifier.

9. The method of operating a vapor rectifier connected to an alternating current source, which consists in initiating a starting arc by a storage battery, thereby starting the rectification of current, and then shifting said rectified current to said battery while maintaining said rectifier in operation.

In witness whereof I have hereunto set my hand this 14th day of March, 1904.

OSIAS O. KRUH.

Witnesses:
BENJAMIN B. HULL,
HELEN ORFORD.